United States Patent [19]
Baumgarten et al.

[11] Patent Number: 5,569,081
[45] Date of Patent: Oct. 29, 1996

[54] DISTRIBUTING DEVICE FOR CHOPPER

[75] Inventors: Joachim Baumgarten, Beelen; Georg Eggenhaus, Ostbevern, both of Germany

[73] Assignee: Claas OHG bwaxhaenkt haftende offene Handelsgesellschaft, Harsewinkel, Germany

[21] Appl. No.: 461,672

[22] Filed: Jun. 5, 1995

[30] Foreign Application Priority Data

Jun. 3, 1994 [DE] Germany .......................... 44 19 421.8

[51] Int. Cl.⁶ ..................................................... A01F 12/40
[52] U.S. Cl. .................. 460/112; 460/1; 460/901
[58] Field of Search .................... 460/112, 111, 460/113, 901, 1; 56/10.2 R, DIG. 15

[56] References Cited

FOREIGN PATENT DOCUMENTS

| | | | |
|---|---|---|---|
| 0212270 | 3/1987 | European Pat. Off. | ............... 460/111 |
| 0316923 | 5/1989 | European Pat. Off. | ............... 460/112 |
| 0537621 | 4/1993 | European Pat. Off. | ............... 460/111 |

*Primary Examiner*—Terry Lee Melius
*Attorney, Agent, or Firm*—Michael J. Striker

[57] ABSTRACT

A distributing device for a chopper, in particular attachment chopper for harvester thresher, has several motor-adjustable guiding plates arranged in a deviating housing for guiding a chopped product, and a measuring device for determination of a wind direction and a wind speed. In order to compensate for wind influences on the exiting chopped product, the guiding plates are automatically adjustable in dependence on the measuring value of the measuring device in a corresponding direction so as to produce an asymmetric guiding plate adjustment relative to the longitudinal direction of the chopper or harvester thresher and/or to vary the total spreading width.

22 Claims, 11 Drawing Sheets

$FW = FGH$

DISTRIBUTING DEVICE FOR CHOPPER

BACKGROUND OF THE INVENTION

The present invention relates to a distributing device for a chopper, in particular attachment straw cultivator for harvester threshers.

When straw remains on the field and is plowed in, it increases the bearing force of the ground as humus-forming material. For a fast and unobjectionable rotting the straw must be shortly shopped and uniformly distributed over the whole cutting width of the harvester thresher.

An attachment straw chopper has a chopper housing with cutter drum and countercutters arranged in it for comminuting the straw, and a distributing device arranged in the outlet region of the chopper for distributing the chopped straw. The distributing device provides uniform depositing of the chopped straw or the whole cutting width of the harvester thresher. The distributing device is composed of several motor driven guiding plates arranged in an inclination-adjustable deviating housing so as to guide the chopped product.

A uniform spreading of the chopped straw over the whole cutting width of the harvester thresher is however affected in undesirable manner under the action of wind. Chopped straw which under the action of side wind is retained in not mowed (standing) harvested condition, is again taken up by the harvester thresher in the next cutting width and loads its cleaning device so that only a low traveler speed is possible. Accumulations of chopped straw on the field produced during spreading under the action of wind lead to the formation of poorly rottable chopped straw pads.

For taking care of the problem of spreading of chopped straw under the action of side wind, the known distributing devices are adjustable by a driver in the driver cabin so that the chopped straw is either symmetrically dispersed toward the longitudinal direction of the harvester thresher, or depending on the side wind, is dispersed more or less to the right side or to the left side. For providing such a correction, the driver must however to monitor the spreading of the chopped straw and the distribution on the field which substantially stresses his attention and requires a lot of practice. When the traveling direction is changed and also when unstable wind conditions occur, the driver must provide a completely new orientation as to the adjustment of the distributing device.

SUMMARY OF THE INVENTION

Accordingly, it is an object of the present invention to provide a distributing attachment straw chopper on a harvester thresher, with which the driver does not have to take care of correction of wind influence on the dissipation of the chopper straw, and nevertheless a uniform distribution of the chopped straw over the cutting width is provided.

In keeping with these objects and with others which will become apparent hereinafter, one feature of the present invention resides, briefly stated, in a distributing device for a chopper, in particular an attachment chopper for a harvester thresher, with several motor-adjustable guiding plates for guiding a chopped product in a deviating housing, wherein in accordance with the present invention the chopper or the harvester thresher is provided with a wind measuring device for determination of a wind direction and a wind speed, and the guiding plates for compensation of the wind influence onto the chopped product are automatically adjustable as to their direction in dependence on the measuring values, so that a guiding plate adjustment which is asymmetrical relative to the chopper or the harvester thresher longitudinal direction is produced and/or the whole spreading width is varied.

The actual measuring values of the wind direction and wind intensity are supplied to an electronic evaluating and control device. In accordance with these values the control device controls servomotors or actuators for adjustment of the direction of the guiding plates.

The driver must no longer take care of the compensation of the wind influence onto the spreading of the chopped straw but instead can completely concentrate on the driving of the harvester thresher. The adjustment of the distributing device is changed during a change in the traveling direction and/or irregular wind conditions so that the spreading of the chopped straw is performed uniformly over the cutting width of the harvester thresher.

In accordance with another modification of the present invention, instead of the wind measuring device, the chopper or harvester thresher has at least one optical or acoustic sensor for contactless detection of the flight path of the dissipated chopped straw. The sensor signals are supplied to the evaluating and control device which, in correspondence with the signals, controls the servomotors or actuators of the guiding plates. It is to be understood that a combination of the wind measuring device and the chopped straw flight path sensor is possible as well.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
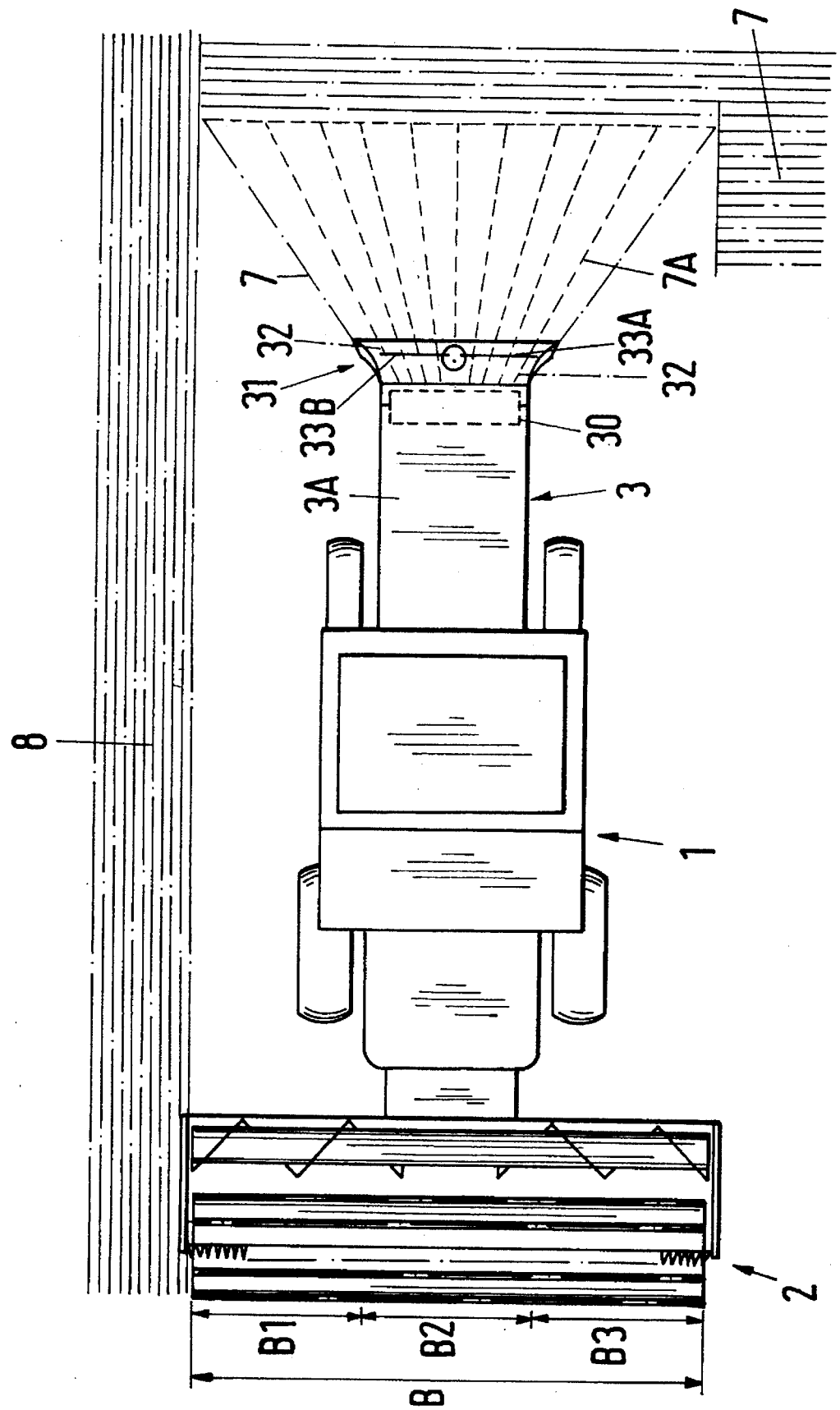
FIG. 1 is a schematic plan view of a harvester thresher during harvesting travel.

A harvester thresher is identified as a whole with reference numeral 1 in FIG. 1. It is provided with a cutting mechanism 2 at its front side and an attachment straw chopper 3 at its rear side. An inclination-adjustable deviating housing 31 for chopped straw 7 is arranged in the output region of the attachment straw chopper. Guiding plates 32 for guiding the chopped straw 7 are arranged in the deviating housing 31. They are identified in FIG. 1 with broken lines, and several flight paths of the chopped straw 7 are shown in their extension. Still standing crop stalk 8 is shown at the right side near the harvester thresher 1 as considered in a traveling direction. During the next cutting width it will be mowed. The chopped straw which lies on the field and is uniformly distributed, is shown behind the harvester thresher 1 and on the left near it as considered in the traveling direction. The chopped straw spreading shown in FIG. 1 is symmetrical relative to the longitudinal direction 1A of the harvester thresher and is uniformly distributed over the whole cutting width B.

Figure 2:
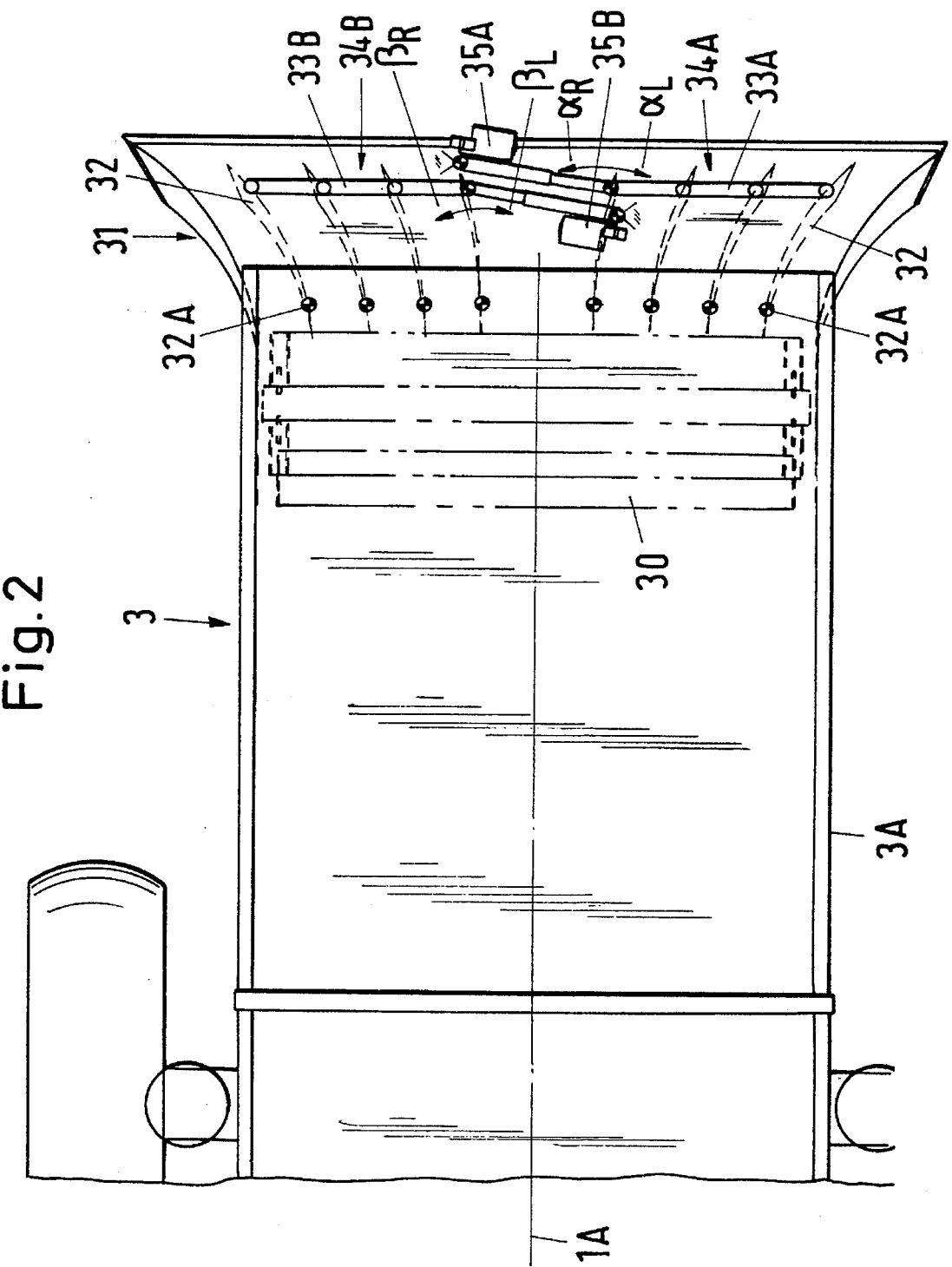
FIG. 2 is a plan view of a chopper housing with two groups of guiding plates which are independently adjustable by servomotors.

The attachment straw chopper 3 for comminuting the straw has a cutter drum 30 arranged in the chopper housing 3A and provided with countercutters as schematically shown in FIG. 2. Guiding plates 2 for guiding the chopped straw 7 are arranged in the inclination-adjustable deviating housing 31 each turnable about an axis 32A and motor-adjustable. The shortly chopped straw 7 is thrown through the rotatable cutter drum 30 into the deviating housing 31 of the distributing device. In addition, the attachment straw chopper 3 has a not shown blower for blowing out of the chopped straw 7.

As shown in FIG. 2, the guiding plates 32 are connected at both sides (left and right) of the longitudinal direction 1A of the harvester thresher by a coupling rod 33A, 33B. Each guiding plate group 34A, 34B is adjustable independently from another group by a single servomotor or actuator 35A, 35B in direction toward the longitudinal direction 1A of the chopper-harvester thresher. The adjusting directions of the guiding plates 31 in the left half of the deviating housing 31 are identified with references $\alpha_L$ and $\alpha_R$, while the adjusting directions of the guiding plate 31 in the right half are identified with references $\beta_L$ and $\beta_R$.

Figure 3:
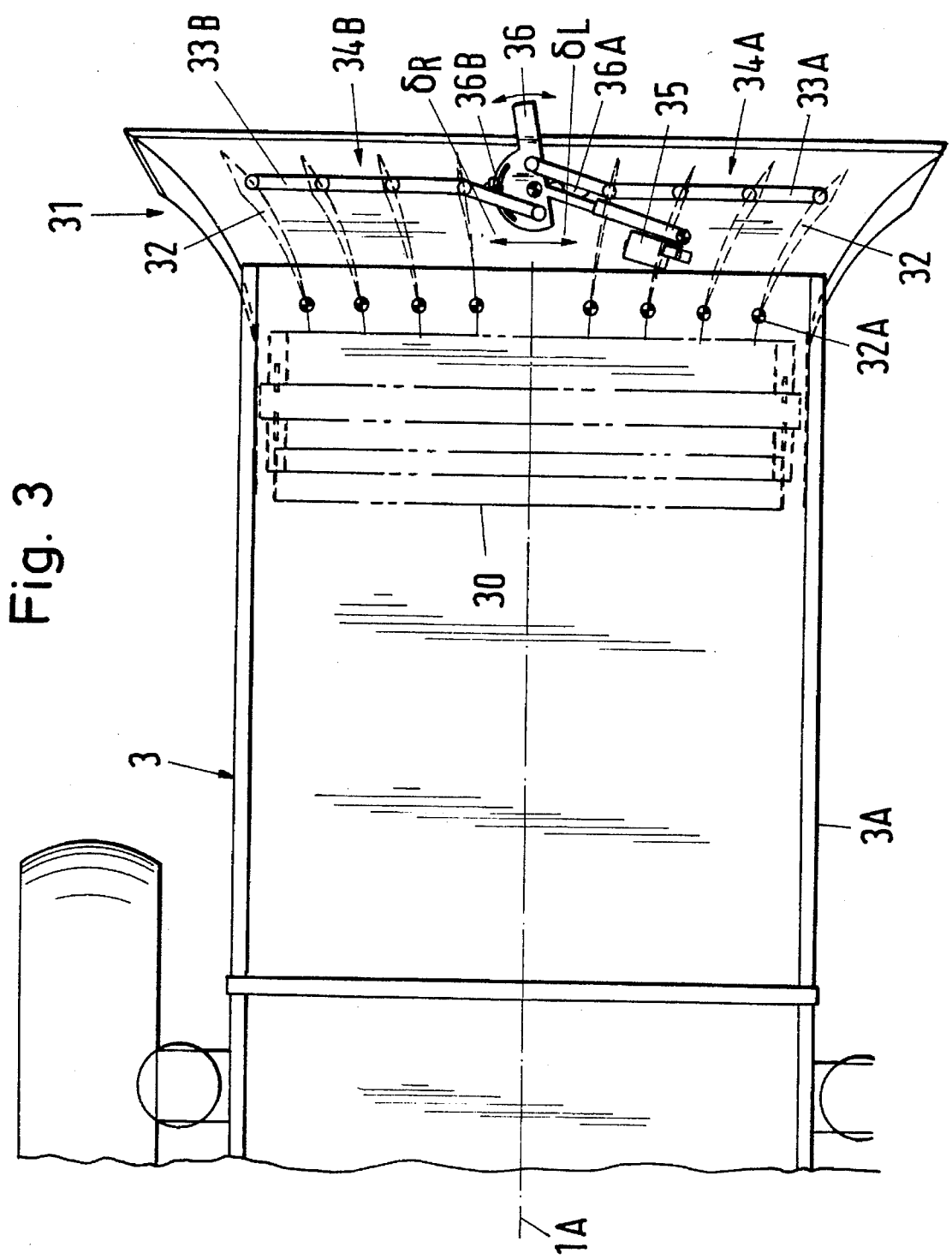
FIG. 3 is a plan view of the chopper housing with two groups of guiding plates which are connected with one another by an adjusting lever and are adjustable by a common servomotor.

FIG. 3 shows an adjusting device in which both guiding plate groups 34A, 34B are coupled with one another by a manually actuatable adjusting lever 36 for adjusting the spreading width. The both guiding plate groups 34A, 34B are adjustable in the same direction by a common servomotor 35 which engages the adjusting lever 36. For this purpose the adjusting lever 36 is supported displaceably in a guide 36A. With the use of the servomotor 36 a chopped straw guidance which is asymmetrical relative to the longitudinal direction of the chopper/harvester thresher can be produced by the guiding plates with a fixedly adjusted spreading width. The adjusting directions for the guiding plates are identified with $\delta_L$ and $\delta_R$. For adjusting the desired spreading width, the adjusting lever 30 is turned and thereby both guiding plates 34A, 34B are turned in opposite direction but by the same distance. Then the adjusting lever 36 is arrested by a fixing screw 36B in the adjusted position. The adjustment of the adjusting lever 36 can be performed by a motor.

Figure 6:
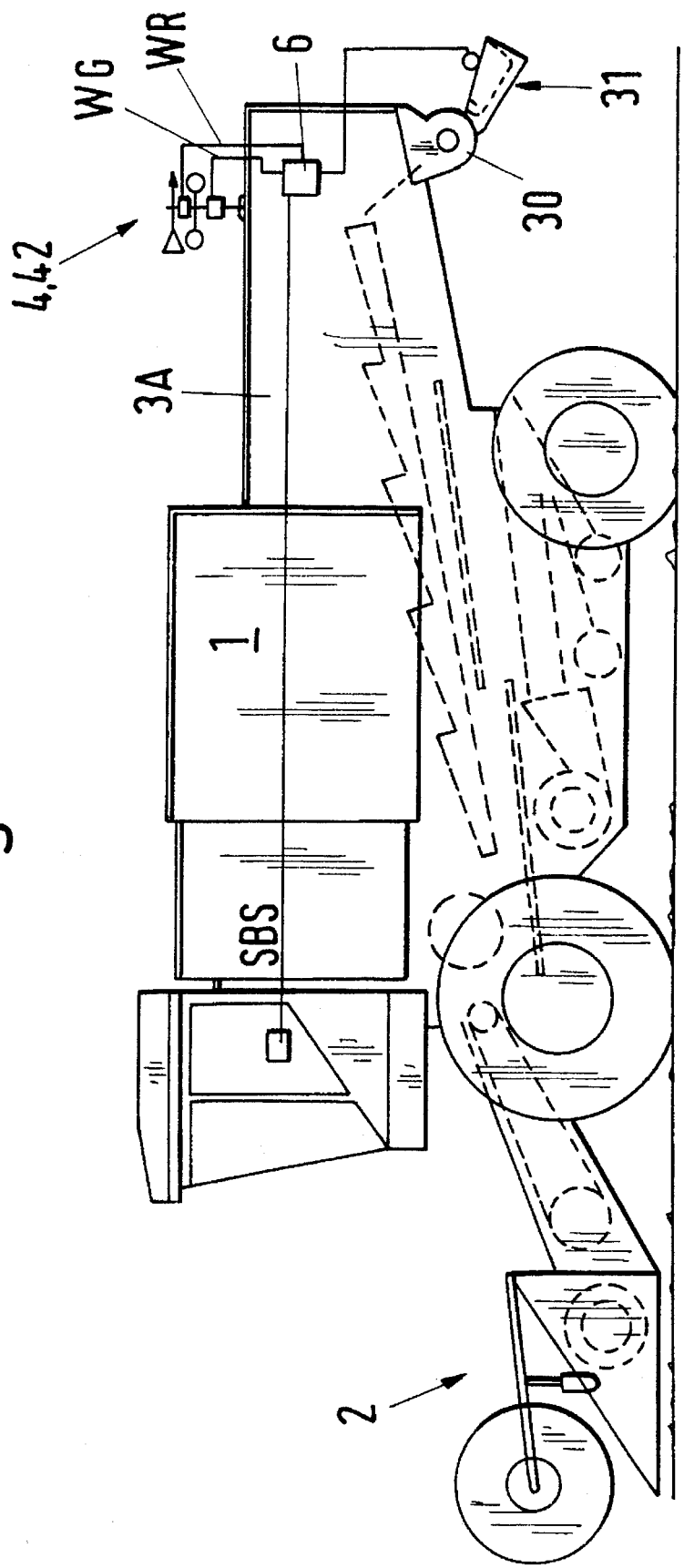
FIG. 6 is a side view of a harvester thresher with a cup-shaped anemometer for wind measurements.

FIG. 6 shows a wind measuring device 4 which is mounted on the roof of the attachment chopper housing 3A. The wind measuring device 4 is composed of a side wind sensor 40 and a counter-rear wind sensor 41. The side wind sensor 40 is formed as a turning plate 40A which is suspended turnably on a horizontal axis 40B extending in the longitudinal direction 1A of the chopper/harvester thresher. The counter-rear wind sensor 41 is also formed as a turning plate which is suspended turnably about a horizontal axis 41B extending transversely to a longitudinal direction of the chopper/harvester thresher.

Figure 5:
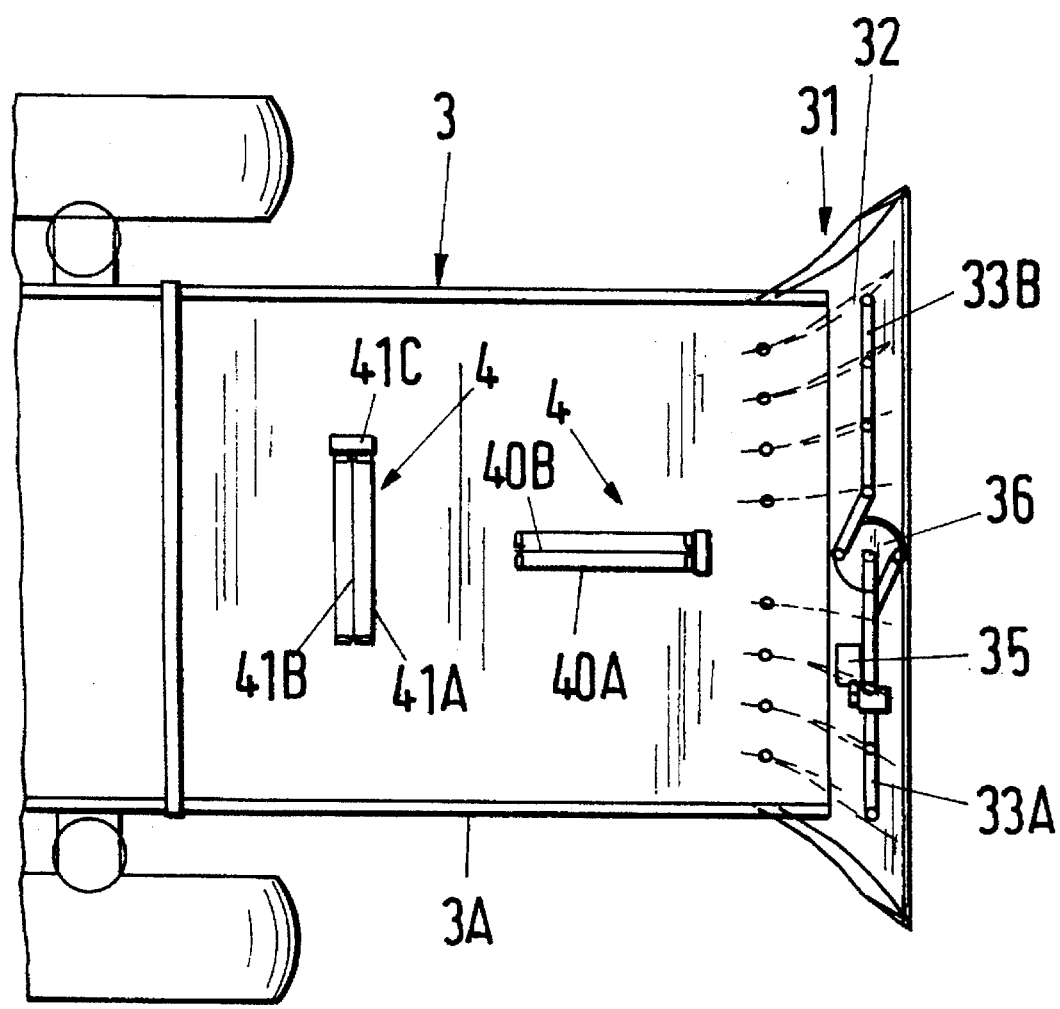
FIG. 5 is a plan view of the chopper housing with two turnably suspended plates for wind measurements.

The deviations of the corresponding turning plate 40A, 41A from its vertical stationary position as a result of the wind dynamic pressure is measured electrically, for example by a rotary potentiometer 40C, 41C arranged on a turning axis 40B, 41B. The sensitivity of the sensors 40, 41 can be varied by mounting of differently great auxiliary masses and/or by installation of friction mechanisms on the suspension of the turning plates 40A, 41A. FIG. 5 shows the chopper housing 3A with both turning plate wind sensors 40, 41 on a plan view.

Figure 4:
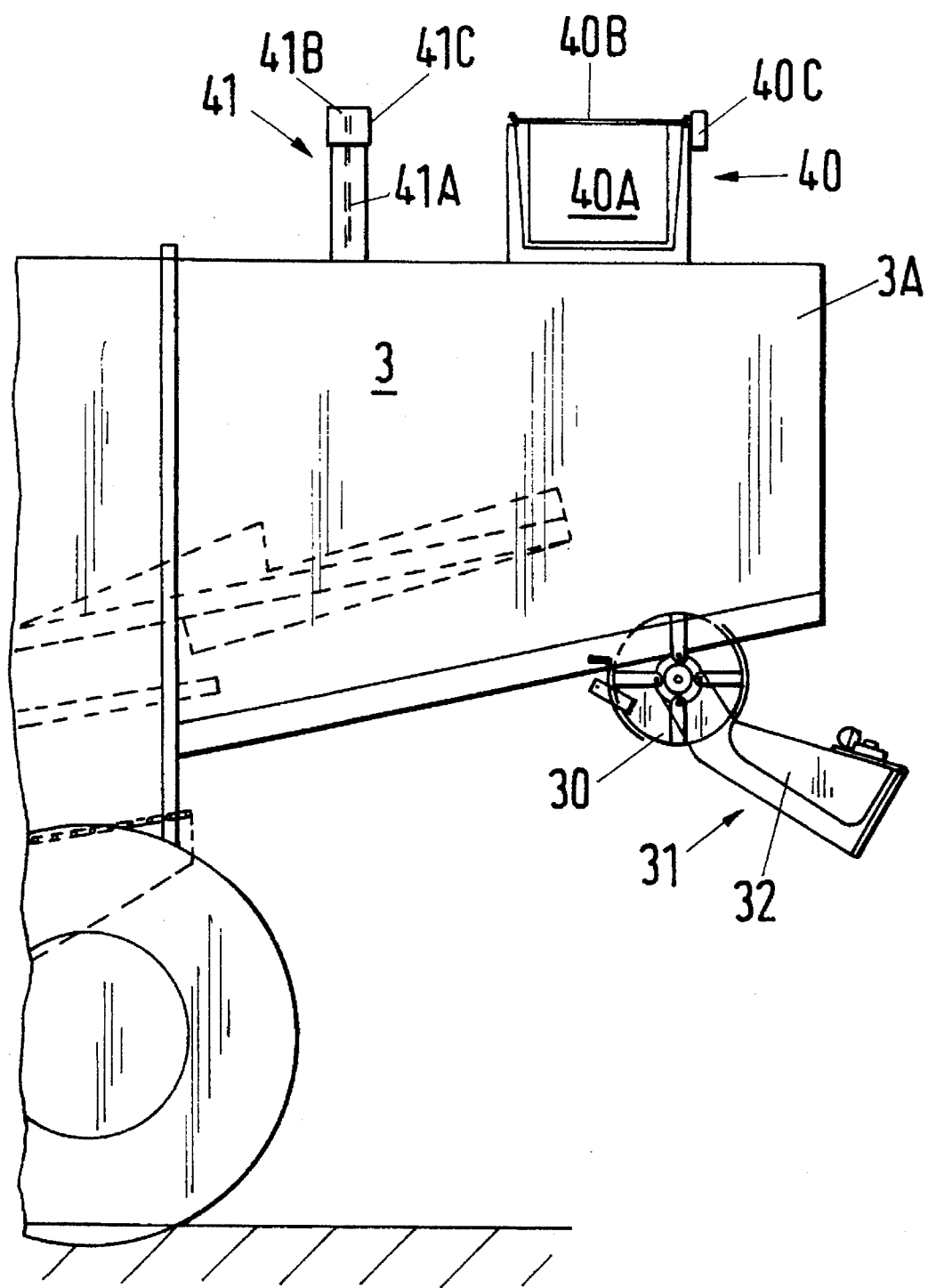
FIG. 4 is a side view of the chopper housing with two plates which are suspended turnably perpendicular to one another for wind measurements.
Figure 4A:
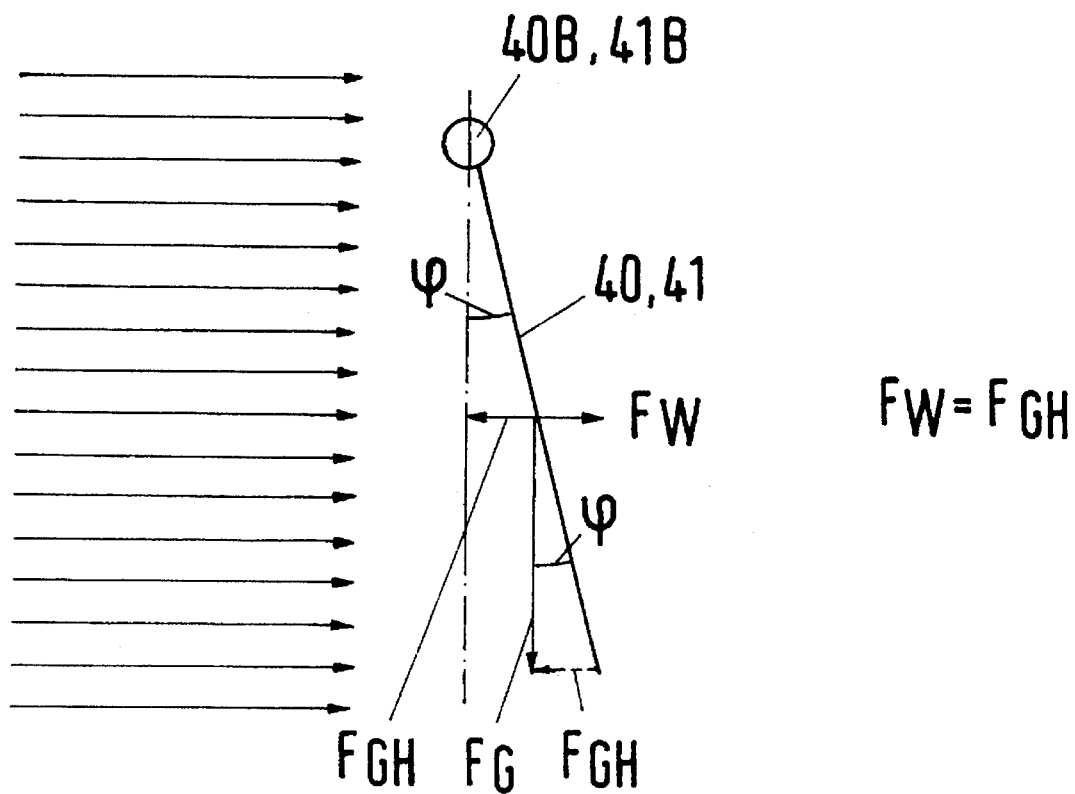
FIG. 4A is a view of a turning plate which is deviated by wind from a vertical stationary position.

One turning plate 40, 41 which is deviated by wind by an angle γ from the vertical stationary position is shown in FIG. 4A. The forces acting on the turning plate 40, 41 are identified in the drawing. The wind force which deviates the turning plate 40, 41 from the vertical stationary position is identified as $F_W$. Simultaneously the gravity force $F_G$ acts on the turning plate 40, 41, and its horizontal component $F_{GH}$ counteracts the wind force $F_W$. In the position of equilibrium both forces are identical.

The equations for determination of the forces are presented hereinbelow:

$$F_G = m \ast g$$

$$F_{GH} = m \ast g \ast \tan \gamma$$

$$F_W = 0.5 \ast A \ast \rho \ast \cos \gamma \ast C^2 \ast C_W$$

These formulas are presented for a square plate. The symbols in the equation are:

m is a mass of the turning plate;

g is an earth acceleration 9.81 m/s²;

γ is a deviating angle

A is an area of the turning plate

ρ is a density of the air 12 mg/l;

C is air speed;

$C_W$ is air resistance factor.

Deviating angles for different wind speeds and two masses are presented in the table:

| No. | m kg | A m² | C m/s | $C_w$ | γ° |
|---|---|---|---|---|---|
| 1 | 1 | 0.04 | 0 | 2.1 | 0.0 |
| 2 | 1 | 0.04 | 2 | 2.1 | 1.2 |
| 3 | 1 | 0.04 | 4 | 2.1 | 4.7 |
| 4 | 1 | 0.04 | 6 | 2.1 | 10.3 |
| 5 | 1 | 0.04 | 8 | 2.1 | 17.4 |
| 6 | 1 | 0.04 | 10 | 2.1 | 25.0 |
| 7 | 1 | 0.04 | 15 | 2.1 | 41.1 |
| 8 | 1 | 0.04 | 20 | 2.1 | 52.1 |
| 9 | 2 | 0.04 | 0 | 2.1 | 0.0 |
| 10 | 2 | 0.04 | 2 | 2.1 | 0.6 |
| 11 | 2 | 0.04 | 4 | 2.1 | 2.4 |
| 12 | 2 | 0.04 | 6 | 2.1 | 5.3 |
| 13 | 2 | 0.04 | 8 | 2.1 | 9.2 |
| 14 | 2 | 0.04 | 10 | 2.1 | 14.0 |
| 15 | 2 | 0.04 | 15 | 2.1 | 27.2 |
| 16 | 2 | 0.04 | 20 | 2.1 | 38.7 |

In an aternative embodiment shown in FIG. 6 a cup-shaped anemometer 42 are not shown impeller anemometer is mounted in the roof of the harvester thresher 1 and operates as the wind measuring device.

In a further embodiment, not shown pressure sensors are arranged on the housing plates of the chopper/harvester thresher 1 for measuring the wind direction and wind speed. They determine elastic deformation caused by wind dynamic pressure.

The obtained actual wind direction and wind speed measuring values WR and WG are supplied to an electronic evaluating and control device formed by an analog circuit or a microprocessor. The evaluating and control device 6 receives further input signals including a traveling speed signal FG, actual signals IW, IWL, IWR of the servomotor 35, 35A, 35B, and a cutting width signal SBS. When the adjusting device has an adjusting lever 36 for the adjustment of the spreading width as shown in FIG. 3, the adjustment of the adjusting lever 36 is also introduced in the evaluating and control device 6.

In the evaluating and control device 6, then nominal values for the servomotor 35, 35A, 35B are calculated in correspondence with the input signals IW, IWL, IWR, WR, WG, SBS, FG. They are then compared with actual values IW, IWl, IWR. Then adjusting values SG, SGA, SGB are calculated as differences between the actual values IW, IWL, IWR and the nominal values for controlling of the servomotors 35, 35A, 35B.

When a side wind acts from the right as considered in the graveling direction in FIG. 2, the guiding plate groups 34A, 34B are turned in direction $\alpha_R$ and $\beta_R$. When a side wind acts from the left, the guiding plate groups 34A, 34B are turned in direction $\alpha_L$ and $\beta_L$. When a wind acts opposite to the traveling direction, the guide plates 32 of the left guide group 34A is turned in direction $\alpha_L$ and the guide plate of the right guide group 34B is turned in direction $\beta_R$. In the case of rear wind the left guiding plate group 34A turns in direction $\alpha_R$ and the right guiding plate group 34B turns in direction $\beta_L$.

When the attachment straw chopper is connected for blowing out of the chopped straw 7 with a blower, then the blower motor can be regulated in dependence on the wind measuring values WR, WG from the evaluating and control device 6. Because of a higher blowing out speed, the flight paths of the exiting chopped straw are not sensitive with respect to disturbing wind influences.

When the instantaneous cutting width B1, B2 or B3 does not correspond to the cutter width B, as is the case for example during mowing of harvested products on field edge strips, the driver can input into the evaluating and control device 6 which cutting width segments B1, B2, B3 is active. The evaluating and control device 6 adjusts the guiding plate groups 34A, 34B so that the chopped straw 7 is distributed over the active cutting width segment B1, B2, or B3 uniformly.

Figure 7:
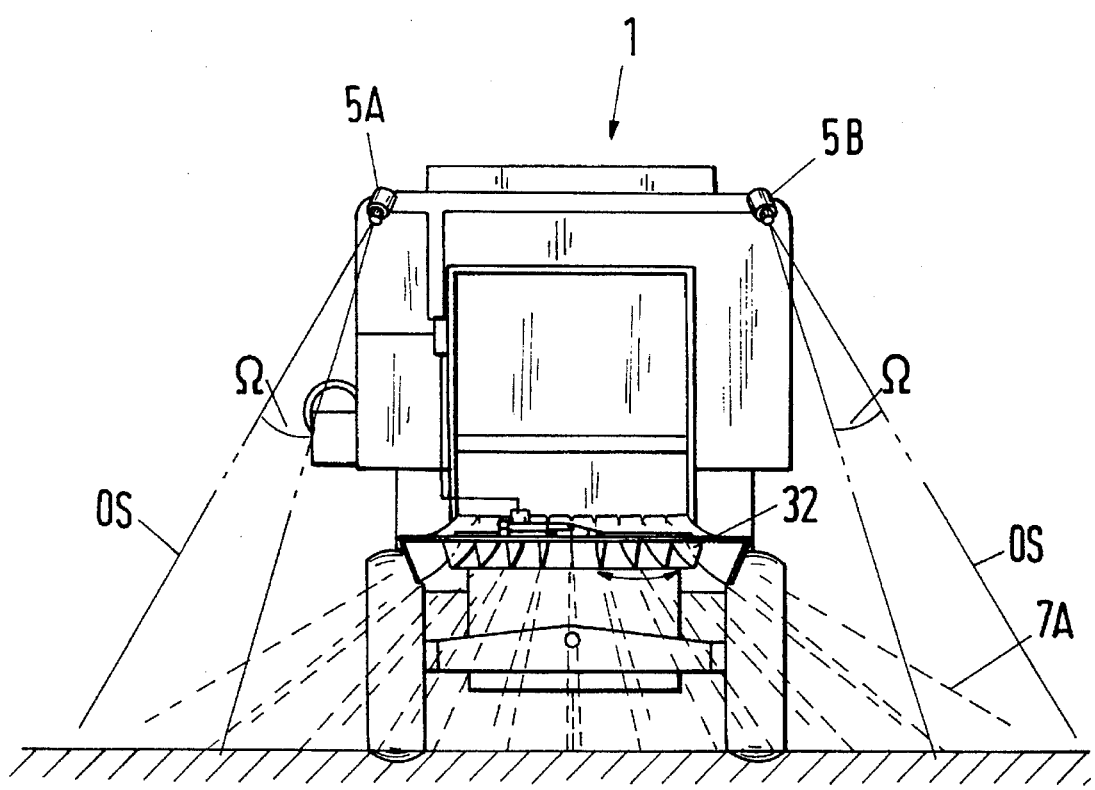
FIG. 7 is a rear view of a harvester thresher with left and right sensors for contactless determination of a chopped straw flight path.
Figure 8:
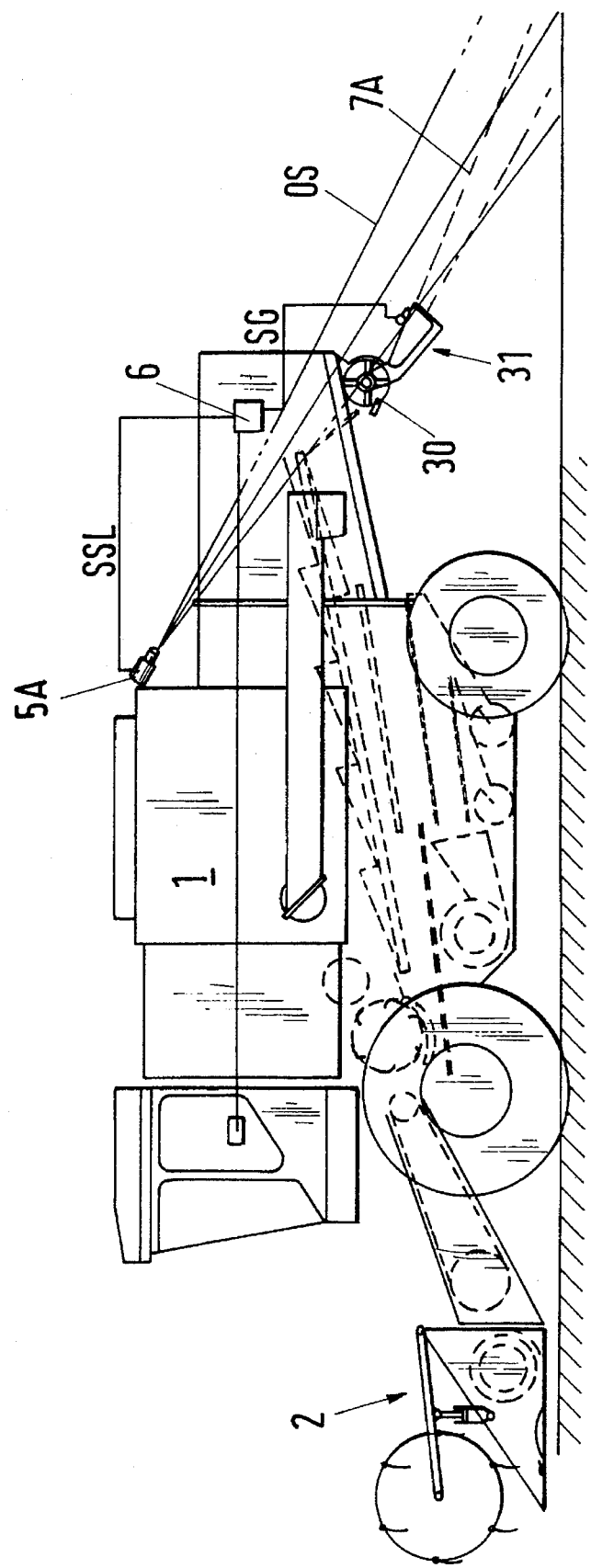
FIG. 8 is a side view of a harvester thresher with a sensor arranged at its side for determination of a chopped straw flight path.
Figure 9:
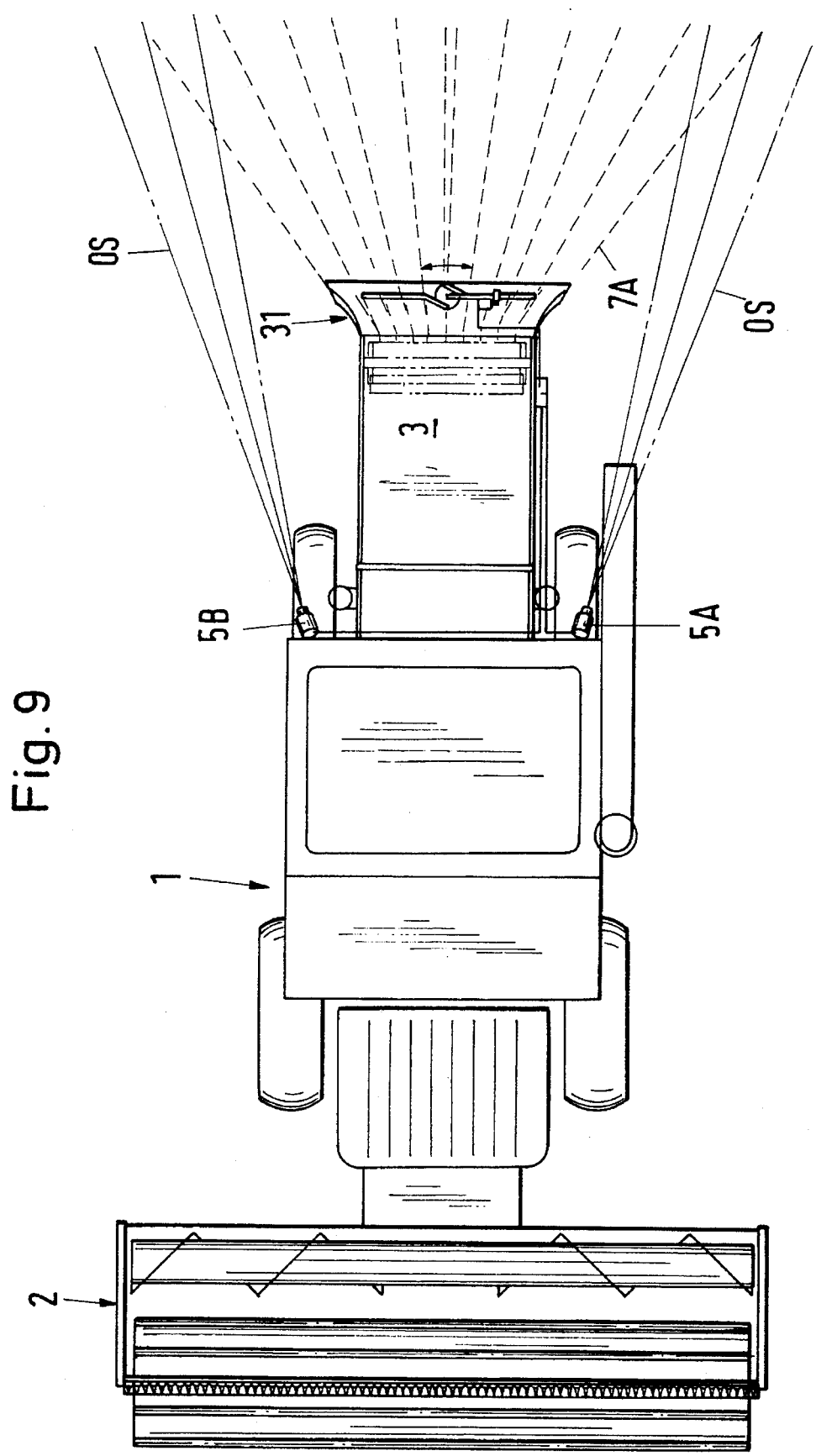
FIG. 9 is a plan view of a harvester thresher with two sensors for contactless sensing of a chopped straw flight path.
Figure 10:
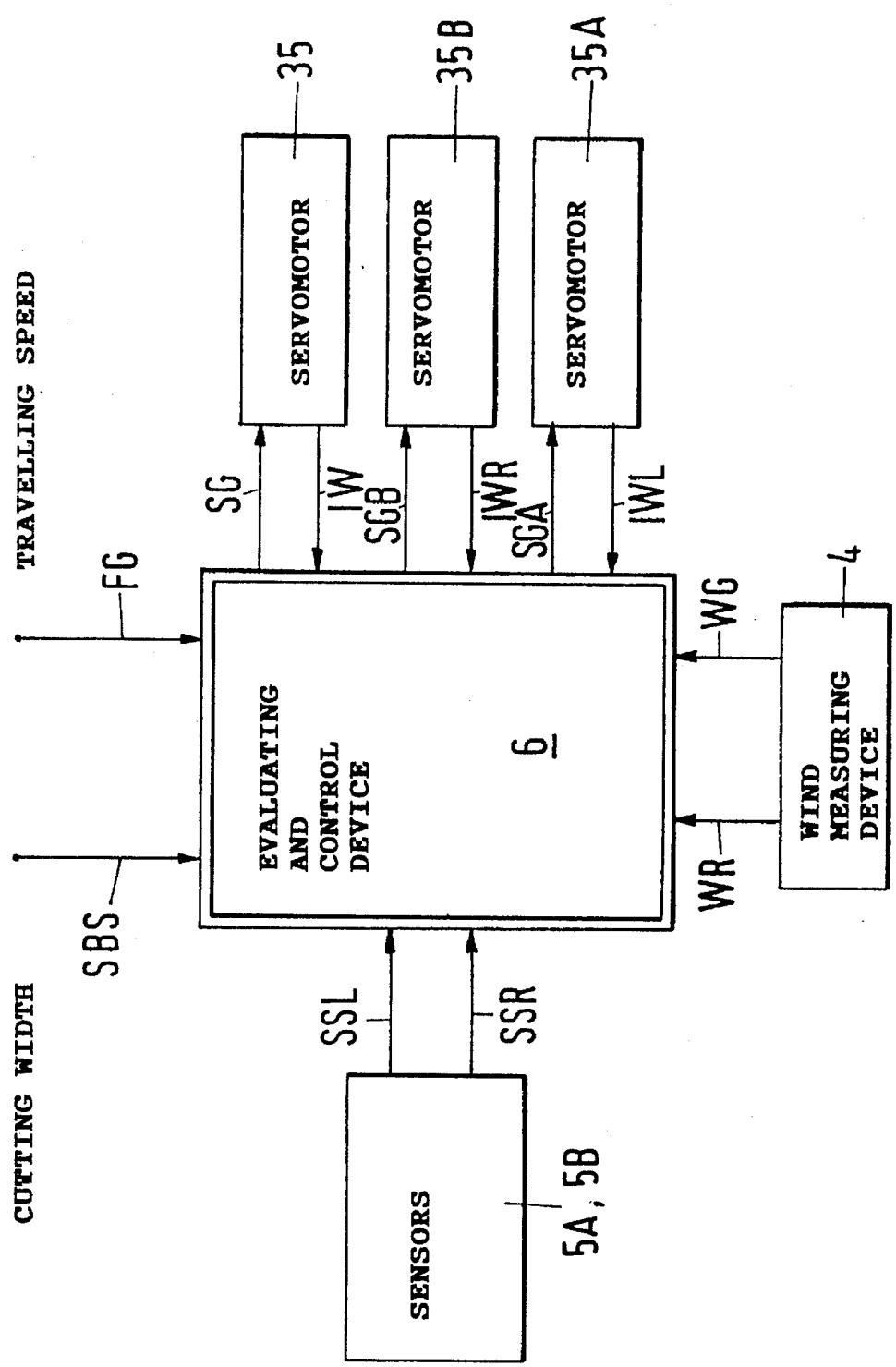
FIG. 10 is a view showing an evaluating and control device for input and output signals.

FIG. 7 shows a rear view of a harvester thresher 1 with optical or acoustic sensors 5A, 5B for detection of the chopped straw 7 exiting the deviating housing 31, located at both sides of the longitudinal direction 1A of the chopper/harvester thresher. The sensors 5A, 5B emit orientation beams in direction toward the ground under adjustable angles to a vertical plane and to the longitudinal direction 1A of the harvester thresher in a predetermined spatial angle $\Omega$. The orientation beams OS are reflected back from the chopped straw 7 to the sensors 5A, 5B. The sensors 5A, 5B determine whether the spreading width of the chopped straw 7 exceeds a predetermined region at the left side and/or at the right side of the longitudinal direction 1A of the harvester thresher. The sensor signals SSL, SSR are supplied to the evaluating and control device 6 and evaluated there for controlling the servomotors 35, 35A, 35B. When for example under the action of a side wind from the left the chopped straw is applied in undesirable manner too far to the right, this is detected by the sensor 5B arranged at the right side and reported to the evaluating and control device 6. Then the right guiding plate group 34B is turned in direction $\beta_L$ for compensation of the side wind influence.

Instead of two sensors 5A, 5B also one sensor can be utilized. Such a sensor is turnable back and forth periodically around the longitudinal direction 1A of the chopper/harvester thresher and therefore the monitored turning region is adjustable.

The sensors 5A, 5B in a first embodiment of the invention are formed by a laser transmitting/receiving device. In a second embodiment the sensors 5A, 5B are formed by an ultrasound transmitting/receiving device. In a further embodiment, the sensors 5A, 5B can be formed by a radar transmitting/receiving device.

It will be understood that each of the elements described above, or two or more together, may also find a useful application in other types of constructions differing from the types described above.

While the invention has been illustrated and described as embodied in a distributing device for chopper, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for adjustably guiding a chopped product produced by a chopper of a harvester thresher having a longitudinal direction, comprising a deviating housing; a plurality of guiding plates adjustably arranged in said deviating housing and guiding a chopped product; measuring means for measuring at least one parameter of wind acting during operation and producing a measuring value; and a motor means connected with said guiding plates and configured so that, in dependence on the measuring value, said motor means activate said guiding plates to compensate for a wind influence on spreading of the chopped product.

2. An arrangement as defined in claim 1, wherein said measuring means include means for determination of a wind direction and a wind speed.

3. An arrangement as defined in claim 1, wherein said measuring means and said motor means are formed so as to provide an asymmetrical adjustment of said guiding plates in dependence on the measuring value.

4. An arrangement as defined in claim 1, wherein said measuring means and said motor means are formed so as to change a total spreading width of the chopped product in dependence on the measuring value.

5. An arrangement as defined in claim 1, wherein said measuring means include a side wind sensor formed as a plate which is suspended turnably about a horizontal axis extending in the longitudinal direction so that a deviation of said plate from its vertical stationary position under the action of the wind dynamic pressure is electrically measured.

6. An arrangement as defined in claim 1, wherein said measuring means include a counter-rear wind sensor which is formed as a plate suspended turnably about a horizontal axis extending transversely to the longitudinal direction so that a deviation of said plate from its vertical stationary position under the action of a wind dynamic pressure is electrically measured.

7. An arrangement as defined in claim 1, wherein said measuring means includes a cup-shaped anemometer.

8. An arrangement as defined in claim 7, wherein said measuring means includes an impeller anemometer.

9. An arrangement as defined in claim 1; and further comprising a housing member, said measuring means including pressure sensors arranged on said housing member and determining elastic deformations caused by a wind dynamic pressure so as to measure a wind direction and a wind intensity.

10. An arrangement as defined in claim 1, wherein said guiding plates are arranged at both sides of the longitudinal direction and connected by a coupling rod so as to be assembled in guiding plate groups, said guiding plate groups being adjusted independently from one another by said motor means in the longitudinal direction.

11. An arrangement as defined in claim 10, wherein said motor means include a servomotor.

12. An arrangement as defined in claim 1, wherein said guiding plates are arranged at both sides of the longitudinal direction and assembled in two guiding plate groups which are coupled with one another by an adjusting lever, said two guiding plate groups being adjustable in a same direction by said motor means formed as a servomotor engaging with said adjusting lever.

13. An arrangement as defined in claim 1, wherein said measuring means include means for producing actual wind direction values, means for producing wind speed measuring values, means for producing a traveling speed signal, means for producing a cutting width signal; and further comprising an evaluating and control device receiving said wind direction values, said wind speed measuring values, said traveling speed signal and said cutting width signal from said measuring means and also receiving actual values of said motor means as input signals and controlling said motor means in dependence on said input signals for adjusting a direction of said guiding plates.

14. An arrangement as defined in claim 13, wherein said guiding plates are arranged at both sides of the longitudinal direction and assembled in guiding plate groups connected with one another by an adjusting lever, said evaluating and control device also receiving an input signal corresponding to a position of said adjusting lever.

15. An arrangement as defined in claim 1, wherein said measuring means includes at least one sensor arranged at a rear part of the chopper for contactless detection of a flight path of the chopped product exiting the chopper and producing a control signal for controlling said motor means.

16. An arrangement as defined in claim 15; and further comprising an evaluating and control device which receives said control signal and controls said motor means formed as servomotors.

17. An arrangement as defined in claim 15, wherein said at least one sensor is an optical sensor.

18. An arrangement as defined in claim 15, wherein said at least one sensor is an acoustic sensor.

19. An arrangement as defined in claim 15, wherein said sensor includes two sensor elements arranged at both sides of the longitudinal direction and formed so that in order to detect the exiting chopped product they emit orientation beams under adjustable angles to verticals to the longitudinal direction and in a predetermined spatial angle toward ground, so that the orientation beams are reflected from the chopped product back to said sensors.

20. An arrangement as defined in claim 15, wherein said at least one sensor is formed as a laser transmitting/receiving device.

21. An arrangement as defined in claim 15, wherein said sensor is formed as an ultrasound transmitting/receiving device.

22. An arrangement as defined in claim 15, wherein said sensor is formed as a radar transmitting/receiving device.

* * * * *